(12) United States Patent
Holm, III

(10) Patent No.: US 8,950,444 B2
(45) Date of Patent: Feb. 10, 2015

(54) PORTABLE PUMP AND CONTAINER ASSEMBLY

(71) Applicant: Charles Francis Holm, III, Edgewater, MD (US)

(72) Inventor: Charles Francis Holm, III, Edgewater, MD (US)

( * ) Notice: Subject to any disclaimer, the term of this patent is extended or adjusted under 35 U.S.C. 154(b) by 235 days.

(21) Appl. No.: 13/680,370

(22) Filed: Nov. 19, 2012

(65) Prior Publication Data

US 2014/0137958 A1    May 22, 2014

(51) Int. Cl.
*B65B 31/04* (2006.01)
*F01M 11/04* (2006.01)
*F16N 31/00* (2006.01)

(52) U.S. Cl.
CPC ........... *F01M 11/045* (2013.01); *F16N 31/004* (2013.01)
USPC ............ 141/65; 141/286; 220/86.1; 137/544; 137/205; 184/1.5; 184/28

(58) Field of Classification Search
CPC .............................. F01M 11/045; F16N 31/004
USPC ...................... 141/65, 69, 231, 286; 220/86.1; 137/544, 565.17, 205; 184/1.5, 28, 58; 222/205
See application file for complete search history.

(56) References Cited

U.S. PATENT DOCUMENTS

| | | | | |
|---|---|---|---|---|
| 2,029,781 | A * | 2/1936 | McLean | 141/126 |
| 4,548,088 | A * | 10/1985 | Hood, Jr. | 73/864.34 |
| 5,172,739 | A * | 12/1992 | Ristroph | 141/98 |
| 5,450,924 | A * | 9/1995 | Tseng | 184/1.5 |
| 5,518,047 | A * | 5/1996 | Alexandrowski | 141/59 |
| 6,357,492 | B1 * | 3/2002 | Hsu | 141/26 |
| 6,474,443 | B2 * | 11/2002 | Kearns et al. | 184/1.5 |
| 6,484,744 | B1 * | 11/2002 | Tseng | 137/205 |
| 7,367,366 | B2 * | 5/2008 | Liao | 141/26 |
| 2001/0035208 | A1 * | 11/2001 | Cromwell et al. | 137/205 |
| 2001/0050199 | A1 * | 12/2001 | Kearns et al. | 184/1.5 |
| 2006/0081304 | A1 * | 4/2006 | Franks | 141/65 |

OTHER PUBLICATIONS

Bigboy Oilchanger at West Marine, date accessed Feb. 6, 2013. <http://www.westmarine.com/webapp/wcs/stores/servlet/ProductDisplay?productId=93490&catalogId=10001&langId=1&storeId=11151&storeNum=50366&subdeptNum=50396&classNum=50402>.

Shurflo Oilchange at West Marine, date accessed Feb. 6, 2013. <http://www.westmarine.com/webapp/wcs/stores/servlet/ProductDisplay?productId=14803&catalogId=10001&langId=-1&storeId=11151&storeNum=50366&subdeptNum=50396&classNum=50402>.

\* cited by examiner

*Primary Examiner* — Jason K Niesz

(74) *Attorney, Agent, or Firm* — Laubscher & Laubscher PC

(57) ABSTRACT

A portable pumping assembly for pumping and transporting fluids includes a container having bottom and side walls defining a chamber and a hand operated pump connected with an upper portion of the container side walls and arranged within the container generally parallel to the container bottom wall. When the pump is operated, fluid is drawn from outside the container and deposited into the container chamber for easy transport to a disposal location or facility.

7 Claims, 2 Drawing Sheets

PORTABLE PUMP AND CONTAINER ASSEMBLY

BACKGROUND OF THE INVENTION

In the maintenance of internal combustion engines, used motor oil must be periodically removed and replaced with oil free of impurities, dirt and debris. In accordance with environmental regulations used motor oil must be collected for proper disposal. As engine maintenance is not always the domain of professionals with access to elaborate garages and used motor oil disposal centers, such maintenance does not always occur in a location convenient to an electric source or disposal centers. In addition, some engines, such as marine engines, have inaccessible drain plugs. The present invention relates to a portable pump and container assembly which can be used to draw used oil from the oil reservoir of an internal combustion engine and transport the used oil to an oil disposal facility.

BRIEF DESCRIPTION OF THE PRIOR ART

Portable oil pumping assemblies are well-known in the prior art. For example, the SHURFLO oil change unit features a portable electric pumping assembly including a diaphragm pump for extracting motor oil from engines and depositing the used motor oil into an integrated storage container for transport. While the SHURFLO device operates satisfactorily, it is limited by the requirement for an electric source for operation. Additionally, the electronic pumping device is located substantially external to the pumping assembly and is at risk to damage from improper handling and storage.

Another device known in the art is the BIGBOY TOPSIDER MVP Oil Changer/Multi-purpose pump which features a manual pump for extracting motor oil from engines and an integrated container for receiving and transporting used motor oil. While the BIGBOY device operates satisfactorily, the manual pump is located substantially exterior to the pumping assembly and is also at risk to damage from improper handling and storage. Further, the integrated container is of a design that permits only a suction hose to be fed into the container. No other objects can be inserted into the container for drainage of fluids.

The present invention was developed in order to overcome these and other drawbacks of the prior devices and to overcome regulatory limitations faced by the skilled handyman working in an area without convenient access to electricity or to a used motor oil disposal center by providing an easy to use, portable, self-contained, manually operated pumping assembly for extracting used motor oil from an engine or to extract other fluids from a confined space.

SUMMARY OF THE INVENTION

Accordingly, it is the primary object of the invention to provide a portable, self-contained, hand operated pumping assembly for extracting and transporting fluids, especially oil. The pumping assembly includes a container and a manually operated pump with a handle arranged at one end externally of the container, a suction inlet at the opposite end also arranged externally of the container, and an outlet arranged within the container.

The portable pumping assembly includes a hose which is connected at one end with the suction inlet of the pump. The other end of the hose is inserted into the dipstick tube or oil fill tube of an engine to a distance sufficient that the end of the tube is at the bottom of the oil reservoir of the engine. The pump is operated to draw dirty oil from the engine and to deposit the dirty oil into the container.

In a preferred embodiment of the invention, the portable pumping assembly includes a screen arranged within the container in spaced relation above the container bottom wall. The screen is used to support an oil filter removed from the engine, so that any residual oil in the filter drains through the screen into the container.

According to a further embodiment, the container includes a removable lid. Once all of the dirty oil has been pumped from the engine, the lid is attached to the container to provide secure transport of the oil without any spillage.

BRIEF DESCRIPTION OF THE FIGURES

Other objects and advantages of the invention will become apparent from a study of the following specification when viewed in the light of the accompanying drawing, in which.

DETAILED DESCRIPTION

Figure 1:
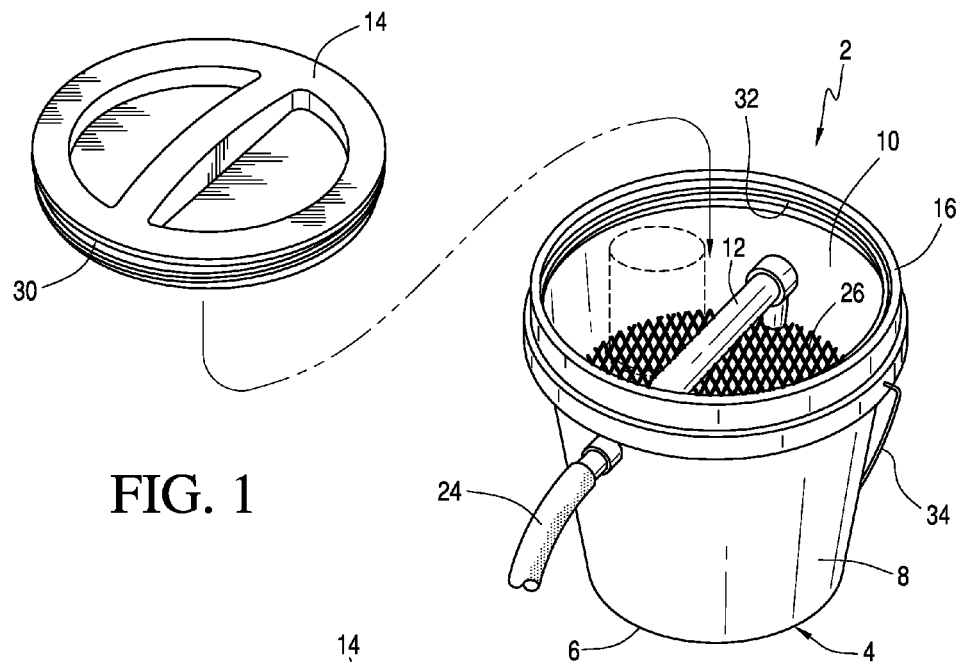
FIG. 1 is a perspective view of the vacuum pump assembly according to the invention.

As shown in FIG. 1, the portable vacuum pump assembly 2 according to the invention includes a container 4 having a bottom wall 6 and side walls 8 defining a chamber 10 which is open at its upper end. A hand pump 12 is connected with the container side walls as will be developed in greater detail below. A lid 14 is removably connected with the upper end 16 of the container.

Figure 2:
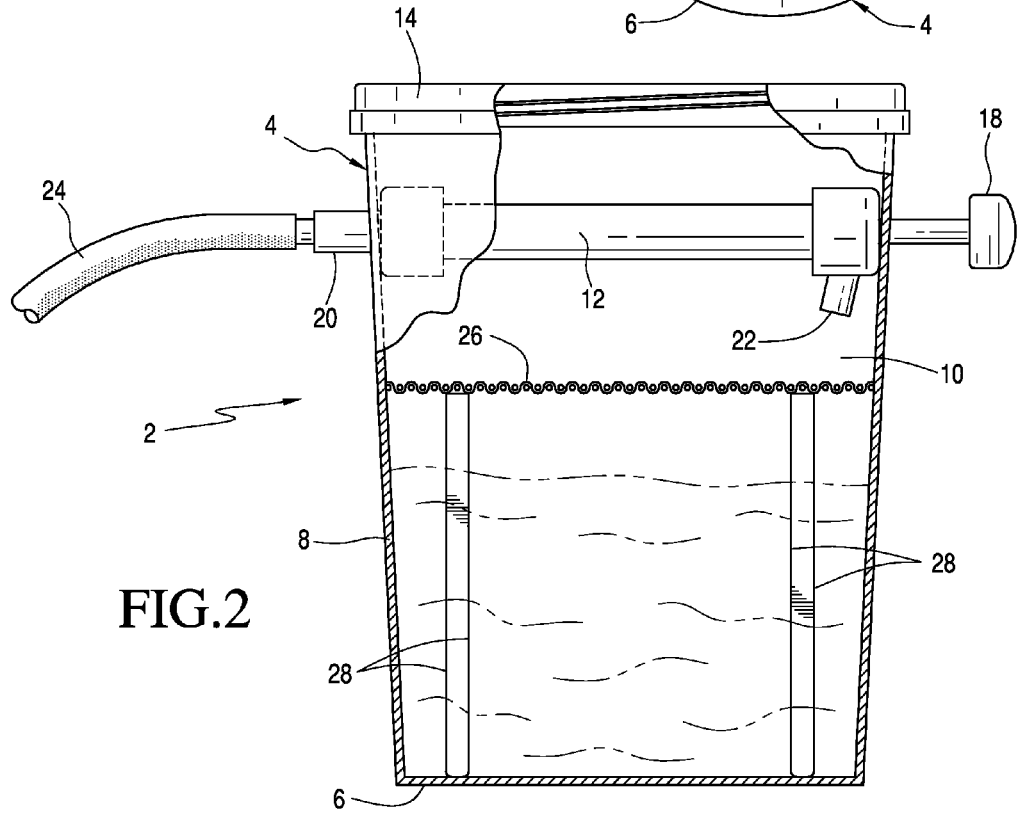
FIG. 2 is a cross sectional view of the vacuum pump assembly of FIG. 1.

Referring now to FIG. 2, the hand pump 12 includes an external handle 18 at one end and a suction inlet 20 at the other end. The pump is arranged generally parallel to the container bottom wall 6. The pump 12 includes an internal piston (not shown) which is operated by the handle in a known manner to draw fluid into a chamber in the pump via the suction opening.

Figure 3:
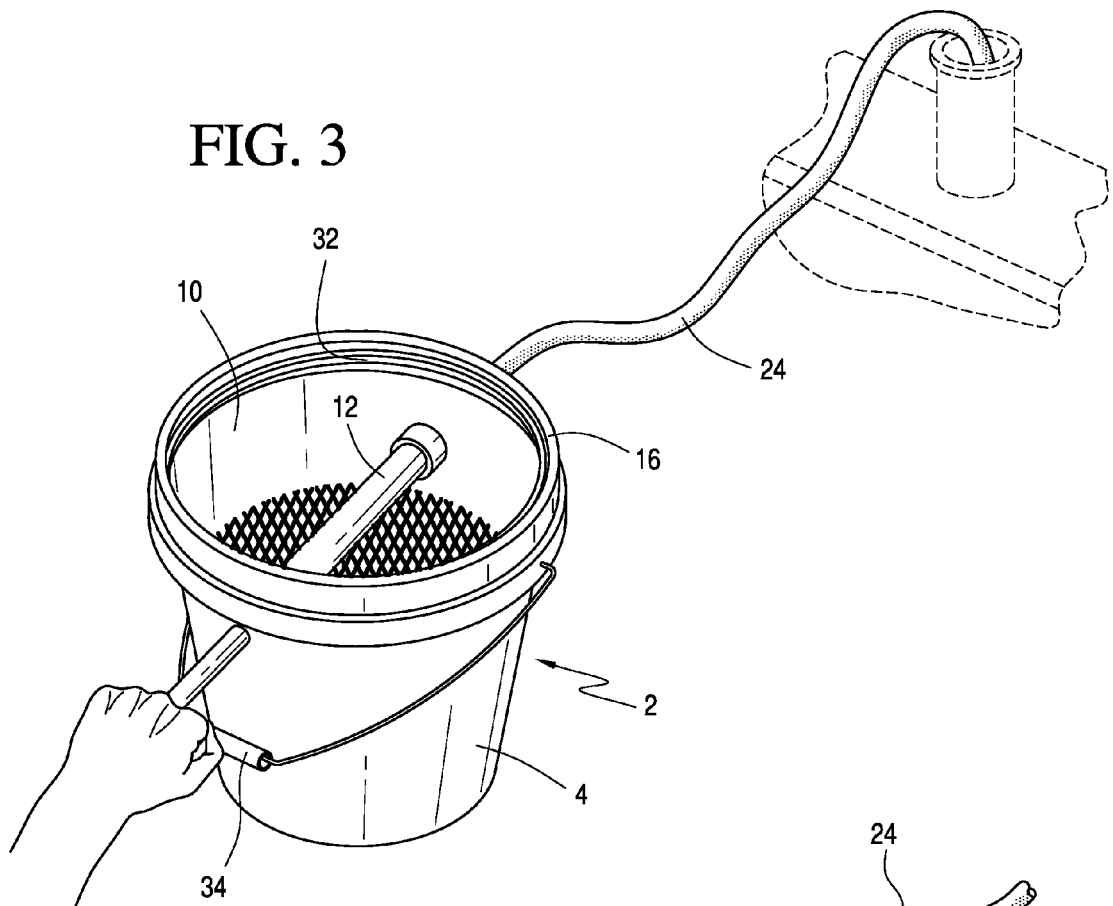
FIG. 3 is a perspective view of an assembly of FIG. 1 in operation for removing oil from an engine.
Figure 4:
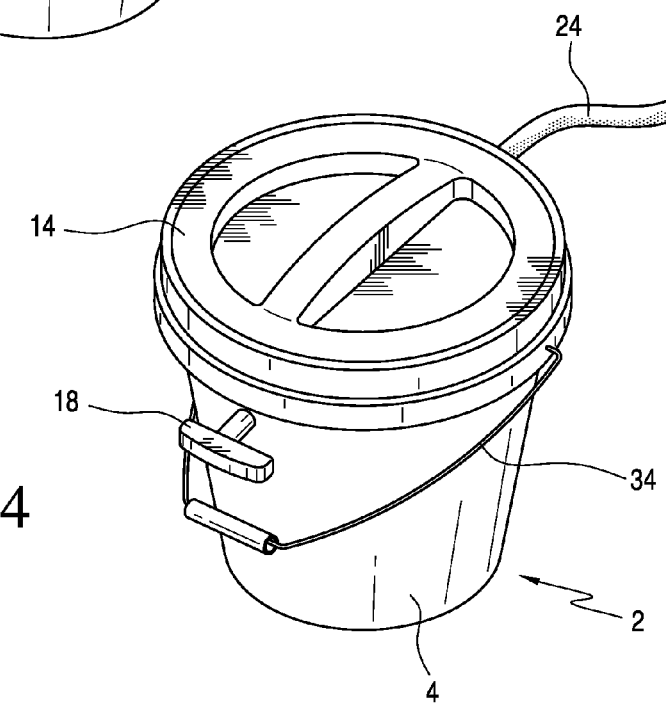
FIG. 4 is a perspective view of the vacuum pump assembly of FIG. 1 with the lid attached to the container.

Referring to FIG. 2, the pump also includes a fluid discharge opening 22 which is arranged within the container chamber. A hose 24 is connected with the suction inlet 20 of the pump. The hose may be any length or a combination of hoses of varying lengths and diameters. The hose fits over the suction inlet 20, preferably by a force fit. The other end of the hose is submerged in the fluid to be extracted from a specific location. With reference to FIG. 3 and in accordance with a preferred embodiment of the invention, the remote end of the hose is inserted into an oil fill tube of an internal combustion engine in order to withdraw used or dirty oil therefrom. By withdrawing the handle from the pump, oil is drawn by suction from the engine oil reservoir through the hose 24, the suction inlet 20 of the pump, the pump chamber and deposited into the container chamber 10 via the discharge opening 22. The handle is operated repeatedly until all of the oil has been removed from the oil reservoir.

Referring once again to FIG. 2, the portable pumping assembly preferably includes a screen 26 arranged in the chamber 10. The screen includes a plurality of legs 28 which space the screen from and above the container bottom wall 6. The screen can be used to support an oil filter, shown in phantom in FIG. 1, to allow used residual oil from the filter to drain into the container chamber.

It will be appreciated by those of ordinary skill in the art that the container may be of any shape or size. In the preferred embodiment shown in the drawing, a cylindrical container is provided in which the side walls 8 are tapered so that the diameter at the top of the container is greater than the diameter at the bottom of the container. The screen is designed with a diameter corresponding with the diameter of an intermediate wall portion of the container so that the screen perimeter is supported by the side walls above the bottom wall.

The portable pumping assembly preferably includes a lid 14 which is removably connected with an upper edge 16 of the container 4 to provide a self-contained receptacle for receiving and transporting fluids and preventing spillage of the contained fluid. The lid 14 includes threads 30 on an external surface thereof for engaging threads 32 located on an upper inner surface 16 of the container 2. Of course, other fastener devices such as a hinge, snap fit or nesting configuration can be provided to connect the lid with the container. A handle 34 is connected with the container to facilitate transport of the container when it is at least partially full of fluid such as dirty oil.

While the preferred forms and embodiments of the invention have been illustrated and described, it will be apparent to those of ordinary skill in the art that various changes and modifications may be made without deviating from the inventive concepts set forth above.

What is claimed is:

1. A portable pumping assembly for pumping and transporting fluids, comprising
   (a) container having a bottom wall and side walls extending upwardly from the bottom wall to define a chamber; and
   (b) a hand operated pump connected with an upper portion of said container side walls and arranged within said chamber generally parallel to said bottom wall, wherein said pump includes a handle at one end extending externally of said container, a suction inlet at the opposite end and extending externally of said container, and an outlet opening arranged within said container, whereby when said pump is operated, fluid is drawn from outside said container and desposited within said chamber.

2. A portable pumping assembly as defined in claim 1, and further comprising a hose connected with said pump suction inlet, whereby said pump can be used to draw fluid from an area remote from said container.

3. A portable pumping assembly for pumping and transporting fluids, comprising
   (a) a container having a bottom wall and side walls extending upwardly from the bottom wall to define a chamber;
   (b) a hand operated pump connected with an upper portion of said container side walls and arranged generally parallel to said bottom wall, whereby when said pump is operated, fluid is drawn from outside said container and deposited within said chamber; and
   (c) a screen arranged within said chamber and supported in spaced relation above said container bottom wall by one of legs connected with said screen and said container side wall.

4. A portable pumping assembly as defined in claim 3, wherein said container has a cylindrical configuration.

5. A portable pumping assembly as defined in claim 4, wherein said container side walls are tapered, said container having a diameter at an upper end which is greater than the diameter at a lower end, said screen having a diameter corresponding with the diameter of an intermediate wall portion of said container, whereby said screen is supported by said side walls in spaced relation from said bottom wall.

6. A portable pumping assembly as defined in claim 3, and further comprising a lid removably connected with an upper edge of said container.

7. A portable oil changing assembly, comprising
   (a) a generally cylindrical container having a bottom wall and side walls extending upwardly from the bottom wall to define a chamber;
   (b) a hand operated pump connected with said container side walls and spanning said chamber, said pump including a handle at one end extending externally from said container, a suction inlet at the opposite end extending externally of said container, and an outlet opening arranged within said container;
   (c) a hose connected with said pump suction inlet; and
   (d) a screen arranged within and extending across said chamber, whereby when a used oil filter is placed on said screen, oil from the filter drains through said screen and into said container, and when said hose is inserted into an oil reservoir of an engine and said pump is operated, oil is drawn from the reservoir and deposited in said container for transport to an oil disposal location.

\* \* \* \* \*